US008888895B1

United States Patent
Fisher et al.

(10) Patent No.: US 8,888,895 B1
(45) Date of Patent: Nov. 18, 2014

(54) METHOD OF $CO_2$ REMOVAL FROM A GASESOUS STREAM AT REDUCED TEMPERATURE

(71) Applicants: James C. Fisher, Morgantown, WV (US); Ranjani V. Siriwardane, Morgantown, WV (US); David A. Berry, Mount Morris, PA (US); George A. Richards, Morgantown, WV (US)

(72) Inventors: James C. Fisher, Morgantown, WV (US); Ranjani V. Siriwardane, Morgantown, WV (US); David A. Berry, Mount Morris, PA (US); George A. Richards, Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 14/022,708

(22) Filed: Sep. 10, 2013

(51) Int. Cl.
*B01D 53/02* (2006.01)
*B01D 53/04* (2006.01)

(52) U.S. Cl.
CPC .................................. *B01D 53/0462* (2013.01)
USPC .................... 95/139; 95/114; 95/117; 95/120; 95/122

(58) Field of Classification Search
USPC ............................. 95/114, 117, 120, 122, 139
See application file for complete search history.

(56) References Cited

U.S. PATENT DOCUMENTS

| | | | | |
|---|---|---|---|---|
| 4,711,645 A | * | 12/1987 | Kumar | 95/98 |
| 5,240,472 A | * | 8/1993 | Sircar | 95/52 |
| 5,846,295 A | * | 12/1998 | Kalbassi et al. | 95/105 |
| 6,048,509 A | * | 4/2000 | Kawai et al. | 423/230 |
| 6,530,975 B2 | * | 3/2003 | Rode et al. | 95/117 |
| 7,938,889 B2 | * | 5/2011 | Iijima | 95/183 |
| 2007/0028772 A1 | * | 2/2007 | Jain et al. | 95/135 |
| 2010/0251887 A1 | | 10/2010 | Jain | |

OTHER PUBLICATIONS

Ishibashi et al., "Technology for Removing Carbon Dioxide from Power Plant Flue Gas by the Physical Adsorption Method," Energy Conyers. Mgmt 37 (1996).

* cited by examiner

*Primary Examiner* — Christopher P Jones
(74) *Attorney, Agent, or Firm* — James B. Potts; Brian J. Lally; John T. Lucas

(57) ABSTRACT

A method for the removal of $H_2O$ and $CO_2$ from a gaseous stream comprising $H_2O$ and $CO_2$, such as a flue gas. The method initially utilizes an $H_2O$ removal sorbent to remove some portion of the $H_2O$, producing a dry gaseous stream and a wet $H_2O$ removal sorbent. The dry gaseous stream is subsequently contacted with a $CO_2$ removal sorbent to remove some portion of the $CO_2$, generating a dry $CO_2$ reduced stream and a loaded $CO_2$ removal sorbent. The loaded $CO_2$ removal sorbent is subsequently heated to produce a heated $CO_2$ stream. The wet $H_2O$ removal sorbent and the dry $CO_2$ reduced stream are contacted in a first regeneration stage, generating a partially regenerated $H_2O$ removal sorbent, and the partially regenerated $H_2O$ removal sorbent and the heated $CO_2$ stream are subsequently contacted in a second regeneration stage. The first and second stage regeneration typically act to retain an initial monolayer of moisture on the various removal sorbents and only remove moisture layers bound to the initial monolayer, allowing for relatively low temperature and pressure operation.

Generally the applicable $H_2O$ sorption/desorption processes may be conducted at temperatures less than about 70° C. and pressures less than 1.5 atmospheres, with certain operations conducted at temperatures less than about 50° C.

20 Claims, 2 Drawing Sheets

METHOD OF CO₂ REMOVAL FROM A GASESOUS STREAM AT REDUCED TEMPERATURE

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments of the present invention relate to the removal of $H_2O$ and $CO_2$ from a gaseous stream by contacting the gaseous stream with $H_2O$ and $CO_2$ removal sorbents, followed by regeneration of the $H_2O$ and $CO_2$ removal sorbents under specific conditions.

BACKGROUND

Carbon dioxide from fossil fuel combustion and industrial processes is a major target in current emission reduction strategies. In particular, post-combustion $CO_2$ capture from the flue gas is a key technology option for retrofitting the existing fleet of power stations. Capture of $CO_2$ from large point sources such as fossil fueled power plants is a major concern in any strategy intended to reduce anthropogenic $CO_2$ emissions.

Generally, approaches for the selective removal of acid gases such as carbon dioxide from these large point sources have utilized aqueous amines, such as monoethanolamine (MEA), diethanolamine (DEA), diglycol-amine (DGA), N-methyldiethanolamine (MDEA), and 2-amino-2-methyl-1-propanol (AMP). This effort has largely extended from successful uses in applications such as gas streams in natural gas, refinery off-gases and synthesis gas processing, however those particular gas streams are generally at high pressures. These approaches suffer when applied to $CO_2$ capture from fossil-fueled based flue gases, which present large volumetric flow rates at low total pressure, temperature generally around 100-150° C., large amounts of $CO_2$ at low partial pressure, and significant $H_2O$ content. As a result, large scale applications are hindered by a variety of challenges, such as cost of scale up, energy cost of regeneration, solvent degradation, the potential environment impacts of the solvents, and others.

Another approach to post-combustion $CO_2$ capture from large point sources has utilized reversible $CO_2$ capture by solid removal sorbents. These solid removal sorbents can provide advantages compared to other techniques, such as reduced energy for regeneration, greater capacity, selectivity, ease of handling, and others. In particular, the regeneration energy requirement for $CO_2$ capture using solid removal sorbents is significantly less than the aqeos amine-based process, because of the absence of large amounts of water and comparatively lower heat capacities. A variety of solid materials have been utilized, including porous carbonaceous materials, zeolites, alumina, silica gels, and metal-organic frameworks. However, the presence of water vapor, which is an inevitable component in flue gas, may negatively affect the capacity of these removal sorbents and reduces the availability of the active surface area.

Solid removal sorbents such as zeolites and others can become easily deactivated by moisture in the gas process stream. Current state of the art $CO_2$ removal techniques generally involve either capturing moisture with the $CO_2$ or removing the moisture prior to capturing the $CO_2$. Removing the moisture prior to capture can be costly in both capital and energy, since typically the moisture removal sorbent must be heated for sorbent regeneration. See e.g., U.S. patent application Ser. No. 12/419,513 by Jain, published as U.S. Pub. No. 2010/0251887, published Oct. 7, 2010; see also Ishibashi et al., "Technology for Removing Carbon Dioxide from Power Plant Flue Gas by the Physical Adsorption Method," *Energy Convers. Mgmt* 37 (1996). These processes typically detail moisture removal sorbent regenerations at temperatures of at least 80° C. and in some situations up to 300° C., in order to fully regenerate the $H_2O$ removal sorbent and remove substantially all adsorbed moisture before re-use in a cycle. The additional heat required for these temperatures is supplied through some means such as power plant steam or electrical heating, and dramatically increase plant efficiencies associated with capture. In some cases, moisture removal requires more than 30% of the total energy of the $CO_2$ removal process.

It would be advantageous if a post-combustion $CO_2$ removal process utilizing a solid removal sorbent were available where $H_2O$ could be reduced prior to $CO_2$ capture in a more economical manner. It would particularly advantageous if the process could utilize relatively low temperature and pressures for the $H_2O$ and $CO_2$ sorption, mitigating the impact on overall efficiency. It would be additionally advantageous if the process could effectively utilize the low partial pressures of various gases in existing process streams and operate the cycle with an $H_2O$ removal sorbent which is only partial regenerated, in order to avoid the relatively high penalties associated the full regeneration processes typically employed.

Disclosed here is a method for the removal of $H_2O$ and $CO_2$ from a gaseous stream such as a flue gas, where the method utilizes first and second stage regenerations to affect an overall regeneration sufficient for a cyclic operation. The first and second regenerations utilize the low partial pressures of $CO_2$ and $H_2O$ within the process streams of the method, and are effective at relatively low temperatures and pressures. The regenerations generally act only to remove moisture layers contained in the multi layers bound to an initial monolayer on the various described $H_2O$ removal sorbents, allowing the Gibbs free energy of mixing to largely compensate for the heats of reaction, and largely avoiding the additional heats required for removal of the initial monolayer. Generally the applicable $H_2O$ sorption/desorption processes may be conducted at temperatures less than about 70° C. and pressures less than 1.5 atmospheres, with certain operations conducted at temperatures less than about 50° C.

These and other objects, aspects, and advantages of the present disclosure will become better understood with reference to the accompanying description and claims.

SUMMARY

The present disclosure is directed to a method for the removal of $H_2O$ and $CO_2$ from a gaseous stream comprising $H_2O$ and $CO_2$, such as a flue gas. The method generally comprises (i) contacting the gaseous stream and an $H_2O$ removal sorbent at a first temperature and transferring a portion of the $H_2O$ to the $H_2O$ removal sorbent, and generating a wet $H_2O$ sorbent and a dry gaseous stream; (ii) contacting the dry gaseous stream and a $CO_2$ removal sorbent at a second temperature and generating a loaded $CO_2$ sorbent and a dry $CO_2$ reduced stream; (iii) conducting a first stage regeneration by contacting the dry $CO_2$ reduced stream and the wet $H_2O$ sorbent at a third temperature and transferring a first quantity of $H_2O$ from the wet $H_2O$ sorbent, and generating a partially regenerated $H_2O$ removal sorbent and an $H_2O$ exhaust stream; (iv) heating the loaded $CO_2$ removal sorbent to a fourth temperature and desorbing a gaseous $CO_2$, generating a regenerated $CO_2$ removal sorbent and a heated $CO_2$ stream; (v) conducting a second stage regeneration by contacting the heated $CO_2$ stream and the partially regenerated $H_2O$ sorbent at a fifth temperature and transferring a second quantity of $H_2O$ from the partially regenerated $H_2O$ sorbent, and generating a regenerated $H_2O$ removal sorbent and a $CO_2$ exhaust stream; and (vi) using the regenerated $H_2O$ sorbent as the $H_2O$ sorbent and using the regenerated $CO_2$ removal sorbent as the $CO_2$ sorbent, and repeating the preceding steps in a cyclic process.

The use of the various process streams to affect a first and second stage regeneration in this manner allows relatively low temperature partial pressure changes to affect an overall regeneration sufficient for a cyclic operation that incorporates some degree of $H_2O$ removal prior to contact with a $CO_2$ sorbent. The method is particularly advantageous for $CO_2$ removal operations where the presence of $H_2O$ above certain levels may be detrimental to the $CO_2$ sorbent. The first and second regenerations typically provide only a partial regeneration of the $H_2O$ sorbent, such that the various $H_2O$ sorbents retain an initial monolayer of moisture throughout the cycle while moisture layers bound to the initial monolayer are removed. This approach enables relatively low temperature and pressure operation by allowing the Gibbs free energy of mixing to compensate for the heat of reaction required to remove the additional moisture layers, while avoiding the necessity to provide additional heat of reaction for removal of the initial monolayer. The method thus largely utilizes the Gibbs free energy of mixing enabled through the partial pressure swings generated by both the dry $CO_2$ reduced stream and the heated $CO_2$ stream for effective moisture removal, allowing the relatively low temperature and pressure operation.

In an embodiment, the first temperature, the second temperature, the third temperature, and the fifth temperature are less than 70° C. In a further embodiment, the first temperature, the second temperature, and the third temperature are less than 50° C. and the fifth temperature is greater than 50° C. In another embodiment, the various operations described by the cycle are conducted at a pressure less than 1.5 atmospheres. The method is particularly advantageous for $CO_2$ removal operations where the presence of $H_2O$ above certain levels may be detrimental to the $CO_2$ sorbent.

The novel process and principles of operation are further discussed in the following description.

DETAILED DESCRIPTION

Figure 1:
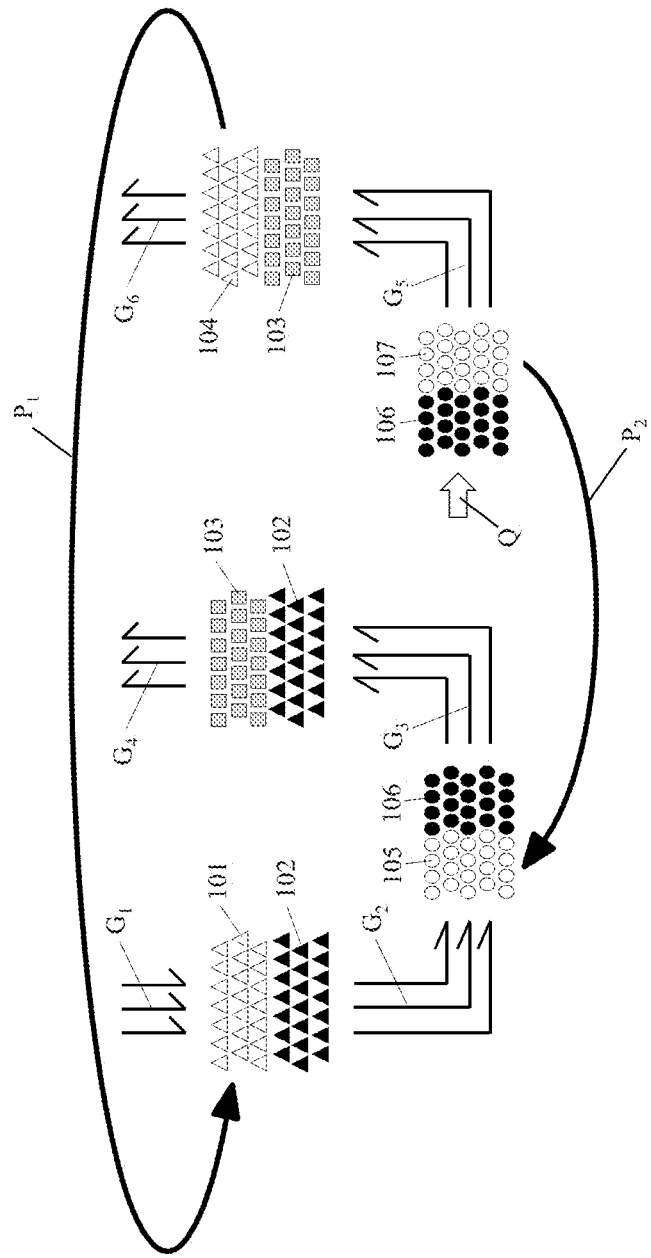
FIG. 1 illustrates the various processes within the disclosed cycle.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method for the removal of $H_2O$ and $CO_2$ from a gaseous stream comprising $H_2O$ and $CO_2$.

Generally, the present disclosure is directed to a method for the removal of $H_2O$ and $CO_2$ from a gaseous stream comprising $H_2O$ and $CO_2$, such as a flue gas. Generally the method initially utilizes and $H_2O$ sorbent to remove some portion of the $H_2O$, producing a dry gaseous stream and a wet $H_2O$ sorbent. The dry gaseous stream is subsequently contacted with a $CO_2$ sorbent to remove some portion of the $CO_2$, generating a dry $CO_2$ reduced stream and a loaded $CO_2$ sorbent. The loaded $CO_2$ sorbent is subsequently heated to produce a heated $CO_2$ stream.

The wet $H_2O$ sorbent and the dry $CO_2$ reduced stream are subsequently contacted and a first quantity of the $H_2O$ transferred from the gaseous stream is removed from the wet $H_2O$ sorbent, generating a partially regenerated $H_2O$ sorbent. Following this, the partially regenerated $H_2O$ sorbent and the heated $CO_2$ stream are contacted and a second quantity of the $H_2O$ transferred from the gaseous stream is removed from the partially regenerated $H_2O$ sorbent, producing a regenerated $H_2O$ sorbent. The use of a first and second stage regeneration in this manner allows relatively low temperature partial pressure changes to affect an overall regeneration sufficient for a cyclic operation which incorporates some degree of $H_2O$ removal prior to contact with a $CO_2$ removal sorbent. The method is particularly advantageous for $CO_2$ removal operations where the presence of $H_2O$ above certain levels may be detrimental to the $CO_2$ removal sorbent.

Generally, the first and second regenerations are expected to only provide a partial regeneration of the $H_2O$ removal sorbent, such that the various $H_2O$ removal sorbents retain an initial monolayer of moisture and typically the dry $CO_2$ reduced stream and the heated $CO_2$ stream only act to remove moisture layers bound to the initial monolayer. This approach enables relatively low temperature and pressure operation by allowing the Gibbs free energy of mixing to compensate for the heat of reaction required to remove the additional moisture layers, while avoiding the necessity to provide additional heat of reaction for removal of the initial monolayer. The method thus largely utilizes the Gibbs free energy of mixing enabled through the partial pressure swings generated by both the dry $CO_2$ reduced stream and the heated $CO_2$ stream for effective moisture removal, allowing the relatively low temperature and pressure operation. Generally the applicable $H_2O$ sorption/desorption processes may be conducted at temperatures less than about 70° C. and pressures less than 1.5 atmospheres, with certain operations conducted at temperatures less than about 50° C.

A general description of the embodiment of the low temperature $CO_2$ removal process is illustrated at FIG. 1. At FIG. 1, a gaseous stream $G_1$ comprised of $CO_2$ and $H_2O$ contacts an $H_2O$ removal sorbent 101 at a first temperature. $H_2O$ removal sorbent 101 sorbs some portion of the $H_2O$ in gaseous stream $G_1$, transferring $H_2O$ from gaseous stream $G_1$ to $H_2O$ removal sorbent 101. The transfer of $H_2O$ from gaseous stream $G_1$ generates wet $H_2O$ removal sorbent 102 and dry gaseous stream $G_2$. Dry gaseous stream $G_2$ is generally gaseous stream $G_1$ less the $H_2O$ transferred from gaseous stream $G_1$ to $H_2O$ sorbent 101, while wet $H_2O$ sorbent 102 generally comprises $H_2O$ removal sorbent 101 and the $H_2O$ transferred from gaseous stream $G_1$ and sorbed on $H_2O$ removal sorbent 101. Correspondingly, dry gaseous stream $G_2$ generally comprises the $CO_2$ from gaseous stream $G_1$ with a reduced amount of $H_2O$.

In an embodiment, the first temperature is less than 70° C. In another embodiment, the first temperature is less than 50° C. and the moisture content of gaseous stream $G_1$ is less than 10 volume percent (vol. %). In a further embodiment, gaseous stream $G_1$ and dry $H_2O$ removal sorbent 102 are contacted at a Gas Hourly Space Velocity (GHSV) of less than about 1500 h$^{-1}$. In an additional embodiment, dry gaseous stream $G_2$ has a moisture content of less than 0.1 volume percent (vol. %) $H_2O$, and in still another embodiment, dry gaseous stream $G_2$ has a moisture content between 0.1 vol. % and 0.02 vol. %. In still another embodiment, contact between gaseous stream $G_1$ and a dry $H_2O$ removal sorbent 101 occurs at a pressure less than 1.5 atmospheres.

Following production of dry gaseous stream $G_2$, dry gaseous stream $G_2$ is contracted with $CO_2$ removal sorbent 105 at a second temperature. $CO_2$ removal sorbent 105 sorbs some portion of the $CO_2$ remaining in gaseous stream $G_2$, transferring $CO_2$ from dry gaseous stream $G_2$ to $CO_2$ removal sorbent 105. The transfer of $CO_2$ from dry gaseous stream $G_2$ to $CO_2$ removal sorbent 105 generates loaded $CO_2$ removal sorbent 106 and dry $CO_2$ reduced stream $G_3$. Dry $CO_2$ reduced stream $G_3$ is generally dry gaseous stream $G_2$ less the $CO_2$ transferred from dry gaseous stream $G_2$ to $CO_2$ removal sorbent 105, while loaded $CO_2$ removal sorbent 106 generally comprises $CO_2$ removal sorbent 105 and the $CO_2$ transferred from dry gaseous stream $G_2$ and sorbed on $CO_2$ removal sorbent 105. In an embodiment, the second temperature is less than 70° C. In a further embodiment, the second temperature is less than 50° C. In still another embodiment, contact between dry gaseous stream $G_2$ and a $CO_2$ removal sorbent 105 occurs at a pressure less than 1.5 atmospheres.

Having now generated dry $CO_2$ reduced stream $G_3$ and $H_2O$ removal sorbent 102, wet $H_2O$ removal sorbent 102 is partially regenerated through contact with dry $CO_2$ reduced stream $G_3$ at a third temperature. The contact transfers a first quantity of $H_2O$ from wet $H_2O$ removal sorbent 102 to dry $CO_2$ reduced stream $G_3$, where the first quantity of $H_2O$ is an amount of the $H_2O$ transferred from gaseous stream $G_1$ to $H_2O$ removal sorbent 101. The contact additionally generates partially regenerated $H_2O$ removal sorbent 103 and $H_2O$ exhaust stream $G_4$. Partially regenerated $H_2O$ removal sorbent 103 generally comprises wet $H_2O$ removal sorbent less the amount of $H_2O$ transferred to dry $CO_2$ reduced stream $G_3$ from wet $H_2O$ removal sorbent 102, while $H_2O$ exhaust stream $G_4$ generally comprises dry $CO_2$ reduced stream $G_3$ and the amount of $H_2O$ transferred to dry $CO_2$ reduced stream $G_3$ from wet $H_2O$ removal sorbent 102.

As indicated, contact between dry $CO_2$ reduced stream $G_3$ and wet $H_2O$ removal sorbent 102 generally provides only a partial regeneration of wet $H_2O$ removal sorbent 102, so that following this contact, partially regenerated $H_2O$ removal sorbent 103 typically retains a significant fraction of the $H_2O$ sorbed onto wet $H_2O$ removal sorbent 102. In an embodiment, wet $H_2O$ removal sorbent 102 has a first moisture content and partially regenerated $H_2O$ removal sorbent 103 has a second moisture content, where the second moisture content is equal to at least 50% of the first moisture content. Here, "first moisture content" means the mass of $H_2O$ sorbed on wet $H_2O$ removal sorbent 102 following the contact between $H_2O$ removal sorbent 101 and gaseous stream $G_1$, and "second moisture content" means the mass of $H_2O$ sorbed on partially regenerated $H_2O$ removal sorbent 103 following the contact between wet $H_2O$ removal sorbent 102 and dry $CO_2$ reduced stream $G_3$. Here and elsewhere within this disclosure, "$H_2O$ sorbed" when used in reference to an $H_2O$ removal sorbent means $H_2O$ adsorbed or absorbed on a non-$H_2O$ material comprising the $H_2O$ removal sorbent, and $H_2O$ hydrogen bonded to one or more $H_2O$ molecules, were the one or more $H_2O$ molecules are adsorbed or absorbed on the non-$H_2O$ material. Further, within this disclosure, the "mass of $H_2O$ sorbed" on a particular removal sorbent means the total mass of $H_2O$ sorbed by the comprehensive mass of the particular removal sorbent designated either following or preceding a described gaseous contact. For example, if wet $H_2O$ removal sorbent 102 comprises a plurality of individual removal sorbent pellets where the plurality has been contacted with dry $CO_2$ reduced stream $G_3$, the mass of $H_2O$ sorbed on wet $H_2O$ removal sorbent 102 refers to the total mass of $H_2O$ sorbed by the plurality of individual removal sorbent pellets comprehensively following contact with dry $CO_2$ reduced stream $G_3$.

Moisture contents as described here may be determined using various means known in the art. For example, the moisture contents for a specific $H_2O$ removal sorbent under a given set of expected or experienced conditions such as temperature, total pressure, partial pressure of surrounding gases, and other physical parameters may be determined using moisture sorption isotherms for the specific $H_2O$ removal sorbent. Alternatively, moisture contents may be determined experimentally for a given $H_2O$ removal sorbent based on reproduction of the expected or experienced conditions. See e.g., Bell, L. N., and Labuza, T. P, *Practical Aspects of Moisture Sorption Isotherm Measurement and Use*, (2nd Ed., 2000).

In another embodiment, the partial regeneration is reflected by a first mass flow rate of $H_2O$ in gaseous stream $G_1$ compared to a second mass flow of $H_2O$ in $H_2O$ exhaust stream $G_4$, where the second mass flow rate of $H_2O$ is less than 70% of the first mass flow rate of $H_2O$. For example, gaseous stream $G_1$ may have a first mass flow rate of $H_2O$ of about 4.5 kg/h prior to contact with dry $H_2O$ removal sorbent 101, while $H_2O$ exhaust stream $G_4$ has a second mass flow rate of $H_2O$ of about 2.5 kg/h following contact with wet $H_2O$ removal sorbent 102, such that the second mass flow rate is about 56% of the first mass flow rate. In another embodiment, the second mass flow rate is greater than about 40% and less than about 70% of the first mass flow rate.

This particular approach of partial regeneration allows for utilization of relatively reduced temperatures during the contact. Correspondingly, the integrated nature by which the preceding processes combine to generate dry $CO_2$ reduced stream $G_3$ may similarly be conducted at relatively reduced temperatures, avoiding the necessity of additional heat inputs. For example, contact between gaseous stream $G_1$ and $H_2O$ removal sorbent 101, contact between dry gaseous stream $G_2$ and $CO_2$ removal sorbent 105, and contact between dry $CO_2$ reduced stream $G_3$ and wet $H_2O$ removal sorbent 102 may be conducted at temperatures less than about 50° C. and pressures less than about 1.5 atmospheres.

Further regeneration of partially regenerated $H_2O$ removal sorbent 103 occurs through regeneration of loaded $CO_2$ removal sorbent 106 and generation of heated $CO_2$ stream $G_5$. Loaded $CO_2$ removal sorbent 106 is heated to a fourth temperature through the heat input Q, and the loaded $CO_2$ removal sorbent desorbs the $CO_2$ gained during the contact between dry gaseous stream $G_2$ and $CO_2$ removal sorbent 105 at the second temperature. The fourth temperature is greater than the second temperature. The increased temperature causes loaded $CO_2$ removal sorbent 106 to desorb gaseous $CO_2$ and regenerated $CO_2$ removal sorbent 107, where regenerated $CO_2$ removal sorbent 107 generally comprises loaded $CO_2$ removal sorbent 106 less the gaseous $CO_2$ desorbed. Additionally, at least some portion of the gaseous $CO_2$ desorbed comprises heated $CO_2$ stream $G_5$. In a particular embodiment, the fourth temperature is greater than 160° C.

Having now generated heated $CO_2$ stream $G_5$ and partially regenerated $H_2O$ removal sorbent 103, partially regenerated $H_2O$ removal sorbent 103 is further regenerated through contact with heated $CO_2$ stream $G_5$ at a fifth temperature. The contact transfers a second quantity of $H_2O$ to heated $CO_2$ stream $G_5$ from partially regenerated $H_2O$ removal sorbent 103, where the second quantity of $H_2O$ is another amount of the $H_2O$ transferred from gaseous stream $G_1$ to $H_2O$ removal sorbent 101. The contact further generates regenerated $H_2O$ removal sorbent 104 and $CO_2$ exhaust stream $G_6$. Regenerated removal sorbent 104 generally comprises partially regenerated $H_2O$ removal sorbent less the second quantity of $H_2O$ transferred to heated $CO_2$ stream $G_5$ from partially regenerated $H_2O$ removal sorbent 103, while $CO_2$ exhaust stream $G_6$ generally comprises heated $CO_2$ stream $G_5$ and the second quantity of $H_2O$ transferred to heated $CO_2$ stream $G_5$ from partially regenerated $H_2O$ removal sorbent 103.

Due to the partial regeneration of wet $H_2O$ removal sorbent 102 conducted earlier in the process, $CO_2$ exhaust stream $G_6$ and $H_2O$ exhaust stream $G_4$ will have a combined mass flow rate of $H_2O$ generally equal to the first mass flow rate of $H_2O$ in gaseous stream $G_1$. In an embodiment, $CO_2$ exhaust stream $G_6$ exhibits a third mass flow rate of $H_2O$, where the third mass flow rate is less than about 60% of the first mass flow rate. In another embodiment, the third mass flow rate is greater than about 30% and less than about 60% of the first mass flow rate. In a further embodiment, the third mass flow rate of $H_2O$ in $CO_2$ exhaust stream $G_6$ is less than the second mass flow rate of $H_2O$ in $H_2O$ exhaust stream $G_4$, so that a majority of the first mass flow rate of $H_2O$ entering the process via gaseous stream $G_1$ exits via $H_2O$ exhaust stream $G_4$.

Having produced both regenerated $H_2O$ removal sorbent 104 and generated $CO_2$ removal sorbent 107, the steps of the process are repeated using regenerated $H_2O$ removal sorbent 104 as $H_2O$ removal sorbent 101 and using regenerated $CO_2$ removal sorbent 107 as $CO_2$ removal sorbent 105, as represented by process paths $P_1$ and $P_2$ respectively.

The first and second regenerations within the process disclosed are generally intended to remove some portion of the sorbed $H_2O$ while leaving an initial monolayer of $H_2O$ intact. Generally, moisture loadings on $H_2O$ removal sorbents comprise an initial monolayer sorbed on non-$H_2O$ removal sorbent materials, accompanied by additional upper layers of $H_2O$, where the additional upper layers are retained through isosteric sorption with the initial monolayer. The heat of reaction necessary to remove the initial monolayer greatly exceeds that required to remove an additional upper layer. For example, in an $H_2O$ removal sorbent of activated alumina, about 40 kJ/mol might be required to remove the initial monolayer, while only about 3-10 kJ/mol may be required to remove an additional upper layer. However, the Gibbs free energy of mixing when moisture is introduced into a sweeping gas is estimated at around 8 kJ/mol. Thus, by providing an $H_2O$ removal sorbent regeneration whereby typically only the additional upper layers of moisture are removed while the initial monolayer is largely retained, the Gibbs free energy of mixing largely compensates for the 3-10 kJ/mol required without an attendant heat of reaction penalty.

Within the particular cycle disclosed here, the generally low temperatures employed leave the initial monolayer of $H_2O$ sorbed onto $H_2O$ removal sorbent 101 intact, in order to avoid the high heats of reaction required to remove that monolayer. Generally within this disclosure, the contact between dry $CO_2$ reduced stream $G_3$ and wet $H_2O$ removal sorbent 102 as well as the contact between heated $CO_2$ stream $G_5$ and partially regenerated $H_2O$ removal sorbent 103 is only intended to remove moisture layers bonded to the initial monolayer of $H_2O$ sorbed on $H_2O$ removal sorbent 101, rather than the initial monolayer itself. Such an approach avoids the high energy penalties associated with desorption of the initial monolayer of $H_2O$ while retaining sufficient $H_2O$ removal capabilities in the $H_2O$ removal sorbent. The relatively low temperatures allows the two-stage regeneration to provide sufficiently viable moisture removal capability over the cycle while greatly mitigating energetic losses from an associated power cycle responsible for providing the heating requirements. As a result, in an embodiment, the first temperature, the second temperature, the third temperature, and the fifth temperature are less than 70° C. In a further embodiment, the first temperature, the second temperature, and the third temperature are less than 50° C. In another embodiment, the first temperature, the second temperature, and the third temperature are greater than 25° C. and less than 50° C.

Additionally, allowing retention of the initial monolayer of moisture on the $H_2O$ removal sorbent throughout the cycle enables effective swing processes based largely on changes in partial pressure, providing for effective sequential use of the various streams generated over the process. By typically removing only the additional upper layers of moisture while the initial monolayer is largely retained, the greatly reduced $H_2O$ partial pressures of dry $CO_2$ reduced stream $G_3$ and heated $CO_2$ stream $G_5$ are effective for sufficient moisture removal based on the shifts in partial pressures alone, and in a manner that allows the Gibbs free energy of mixing to compensate in a manner that avoids the otherwise necessary heat penalties. Correspondingly, the absorption process producing wet $H_2O$ removal sorbent 102 and the sequential regeneration processes producing partially regenerated $H_2O$ removal sorbent 103 and regenerated $H_2O$ removal sorbent 104 may all be conducted under substantially equivalent total pressure conditions. This provides clear advantage in terms of necessary energy input into the process. Correspondingly, in an embodiment, contact between gaseous stream $G_1$ and $H_2O$ removal sorbent 101, contact between dry gaseous stream $G_2$ and $CO_2$ removal sorbent 105, contact between dry $CO_2$ reduced stream $G_3$ and wet $H_2O$ removal sorbent 102, and contact between heated $CO_2$ stream $G_3$ occurs at a total pressure of less than 1.5 atmospheres. In another embodiment, contact between gaseous stream $G_1$ and $H_2O$ removal sorbent 101, contact between dry gaseous stream $G_2$ and $CO_2$ removal sorbent 105, contact between dry $CO_2$ reduced stream $G_3$ and wet $H_2O$ removal sorbent 102, and contact between heated $CO_2$ stream $G_5$ and partially regenerated $H_2O$ removal sorbent 103 occurs at a total pressure between 0.8 and 1.2 atmospheres.

Reflecting the intended retention of retaining at least some portion of the initial monolayer of $H_2O$ on the $H_2O$ removal sorbent throughout the process, in an embodiment, regenerated $H_2O$ removal sorbent 104 has a third moisture content, where "third moisture content" means the mass of $H_2O$ sorbed on regenerated $H_2O$ removal sorbent 104 following the contact between partially regenerated $H_2O$ removal sorbent 103 and heated $CO_2$ stream $G_5$. In this embodiment, the third moisture content is at least 30% of the first moisture content of wet $H_2O$ removal sorbent 102, and at least 50% of the second moisture content of partially regenerated $H_2O$ removal sorbent 103. Similarly, and reflecting the use of regenerated $H_2O$ removal sorbent 104 as $H_2O$ removal sorbent 101 in the cyclic process, in an embodiment, $H_2O$ removal sorbent 101 has an initial moisture content, where "initial moisture content" means the mass of $H_2O$ sorbed on $H_2O$ removal sorbent 101 prior to the contact between $H_2O$ removal sorbent 101 and gaseous stream $G_1$, and the initial moisture content is at least 30% of the first moisture content of wet $H_2O$ removal sorbent 102. In another embodiment, the initial moisture content is at least 50% of the second moisture content of partially regenerated $H_2O$ removal sorbent 103.

The $H_2O$ removal sorbent may be any material which acts to sorb $H_2O$ when placed in contact with a first gaseous stream having a first partial pressure of $H_2O$ and acts to desorb $H_2O$ when placed in contact with a second gaseous stream having a second partial pressure of $H_2O$, where the first partial pressure is greater than the second partial pressure. In an embodiment, the $H_2O$ removal sorbent has a greater chemical affinity for $H_2O$ than $CO_2$, where chemical affinity refers to the tendency of $H_2O$ or $CO_2$ to aggregate on or bond with the $H_2O$ removal sorbent. See e.g. IUPAC, *Compendium of Chemical Terminology* (2nd ed. 1997), among others. In an embodiment, the $H_2O$ removal sorbent is a material having a specific surface area greater than 300 $m^2$ per gram of the material and a pore volume greater than 0.40 ml per grain of the material. In a further embodiment, the $H_2O$ removal sorbent is an activated alumina comprising $Al_2O_3$, a 3A or 4A zeolite comprising aluminum, silicon, and oxygen, a silica gel comprising $Na_2SiO_3$, or mixtures thereof. In another embodiment the $H_2O$ removal sorbent is an absorbent clay comprising an aluminum phyllosilicate, such as but not limited to bentonite, ball clay, fuller's earth, kaolin, attapulgite, hectorite, meerschaum, palygorskite, saponite, sepiaolite, common clay, and fire clay.

The $CO_2$ removal sorbent may be any material which acts to sorb $CO_2$ when placed in contact with a gas stream comprising $CO_2$ at the second temperature and acts to desorb $CO_2$ when heated to the fourth temperature. In an embodiment, the $CO_2$ removal sorbent is a solid sorbent. See e.g., Samanta et al., "Post-Combustion $CO_2$ Capture Using Solid Sorbents: A Review," *Ind. Eng. Chem. Res.* 51 (2012), among others. In a further embodiment, the $CO_2$ removal sorbent comprises a 13X zeolite.

Figure 2:
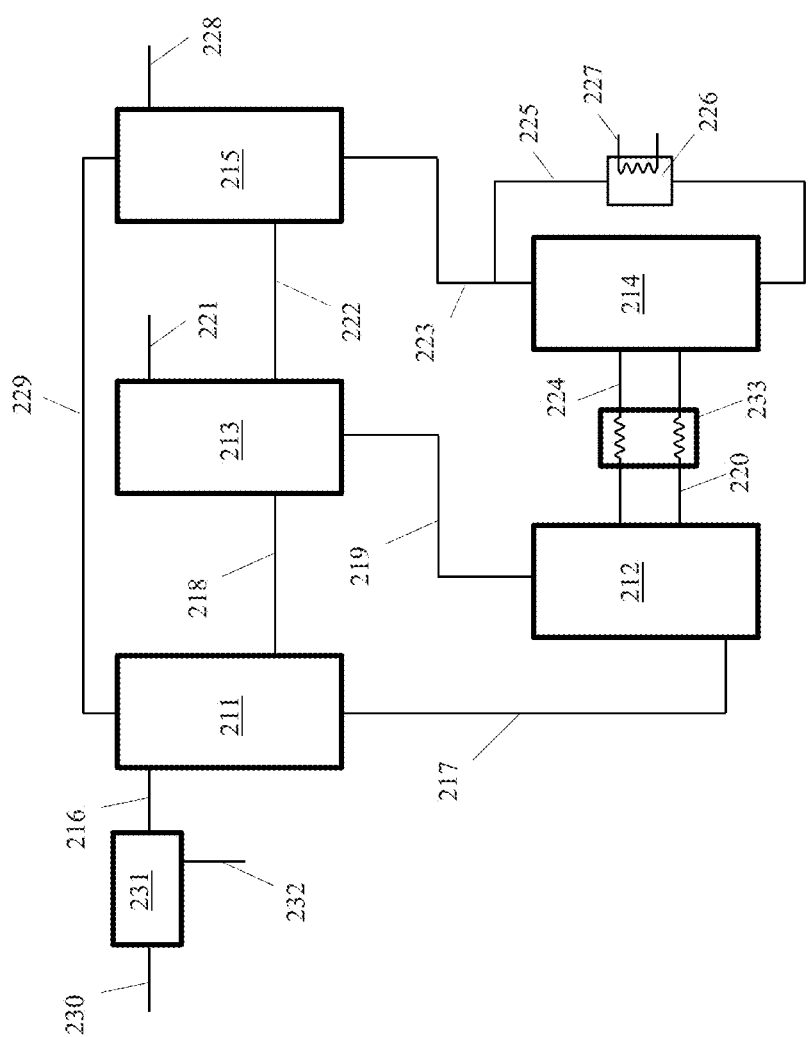
FIG. 2 illustrates a specific embodiment of the disclosed cycle.

A particular embodiment of the process disclosed is illustrated at FIG. 2. At FIG. 2. A gaseous stream comprising $CO_2$ and $H_2O$ enters $H_2O$ capture reactor 211 at inlet 216. The gaseous stream entering at inlet 216 has a temperature of about 40° C. The gaseous stream may be, for example, a flue gas stream cooled to about 40° C. and comprising about 20 wt. % $CO_2$, about 5 wt. % $H_2O$, balance largely $N_2$. $H_2O$ capture reactor 211 establishes the gaseous stream and an $H_2O$ removal sorbent at a first temperature of about 40° C. and a pressure less than about 1.5 atmospheres, and the gaseous stream contacts the $H_2O$ removal sorbent, removing some portion of the $H_2O$ from the gaseous stream, generating a wet $H_2O$ removal sorbent, and producing a dry gaseous stream at a temperature of about 40° C. In a particular embodiment, the dry gaseous stream has a moisture content between 0.1 vol. % and 0.02 vol. %. The dry gaseous stream is discharged from $H_2O$ capture reactor 211 and enters $CO_2$ capture reactor 212 via conduit 217. The wet $H_2O$ removal sorbent exits $H_2O$ capture reactor 211 and enters first $H_2O$ regeneration reactor 213 via conduit 218.

In an embodiment, the gaseous stream entering at inlet 216 derives from a flue gas stream. The flue gas stream has a temperature greater than 40° C. and typically 55-60° C., and is composed of about 20 wt. % $CO_2$ and about 10 wt. % $H_2O$. The flue gas stream is cooled by heat transfer to a cooling medium in cooler 231 to the temperature of about 40° C., and the $H_2O$ content is reduced by about 50% to around 5 wt. %, with the removed water issuing through exit 232.

$CO_2$ capture reactor 212 establishes the dry gaseous stream and a $CO_2$ removal sorbent at a second temperature of about 40° C. and a pressure less than about 1.5 atmospheres, and the dry gaseous stream contacts the $CO_2$ removal sorbent, removing some portion of the $CO_2$ from the dry gaseous stream, generating a loaded $CO_2$ removal sorbent, and producing a dry $CO_2$ reduced stream at a temperature of about 40° C. The dry $CO_2$ reduced stream is discharged from $CO_2$ capture reactor 212 and enters first $H_2O$ regeneration reactor 213 via conduit 219. The loaded $CO_2$ removal sorbent exits $CO_2$ capture reactor 212 and enters $CO_2$ regeneration reactor 214 via conduit 220.

First $H_2O$ regeneration reactor 213 establishes the dry $CO_2$ reduced stream entering via conduit 219 and the wet $H_2O$ removal sorbent entering via conduit 218 at a third temperature of about 40° C. and a pressure less than about 1.5 atmospheres, and the dry $CO_2$ reduced stream contacts the wet $H_2O$ removal sorbent, transferring an amount of $H_2O$ from the wet $H_2O$ removal sorbent to the dry $CO_2$ stream, generating a partially regenerated $H_2O$ removal sorbent, and producing an $H_2O$ exhaust stream at a temperature of about 40° C. The $H_2O$ exhaust stream is discharged from first $H_2O$ regeneration reactor 213 via exhaust 221, and partially regenerated $H_2O$ removal sorbent exits first $H_2O$ regeneration reactor 213 and enters second $H_2O$ regeneration reactor via conduit 222.

In an embodiment, the wet $H_2O$ removal sorbent entering first $H_2O$ regeneration reactor 213 via conduit 218 has a first moisture content and the partially regenerated $H_2O$ removal sorbent exiting first $H_2O$ regeneration reactor 213 via conduit 222 has a second moisture content, and the second moisture content is equal to at least 50% of the first moisture content.

In another embodiment, a first moisture content transfer rate is equal to a mass of the $H_2O$ sorbed the wet $H_2O$ removal sorbent entering first $H_2O$ regeneration reactor 213 via conduit 218 per unit time, and similarly, a second moisture content transfer rate is equal to a mass of the $H_2O$ sorbed on the partially regenerated $H_2O$ removal sorbent exiting first $H^2O$ regeneration reactor 213 via conduit 222 per unit time. In this embodiment, the second moisture content transfer rate is equal to at least 50% of the first moisture content transfer rate.

In a further embodiment, the gaseous stream entering $H_2O$ capture reactor 211 at inlet 216 exhibits a first mass flow rate of $H_2O$ and the $H_2O$ exhaust stream discharging from first $H_2O$ regeneration reactor 213 via exhaust 221 exhibits a second mass flow rate of $H_2O$, and the second mass flow rate of $H_2O$ is less than 70% of the first mass flow rate of $H_2O$. In a further embodiment, the second mass flow rate of $H_2O$ is greater than about 40% and less than about 70% of the first mass flow rate of $H_2O$.

As described, loaded $CO_2$ removal sorbent exits $CO_2$ capture reactor 212 and enters $CO_2$ regeneration reactor 214 via conduit 220. $CO_2$ regeneration reactor 214 heats the loaded $CO_2$ removal sorbent to a fourth temperature of greater than about 160° C. and generally about 200° C., desorbing a gaseous $CO_2$, generating a regenerated $CO_2$ removal sorbent, and producing a heated $CO_2$ stream. The heated $CO_2$ stream exits $CO_2$ regeneration reactor 214 and enters second $H_2O$ regeneration reactor 215 via conduit 223, and the regenerated $CO_2$ removal sorbent exits $CO_2$ regeneration reactor 214 and enters $CO_2$ capture reactor 212 via conduit 224. The regenerated $CO_2$ removal sorbent is subsequently utilized as the $CO_2$ removal sorbent within $CO_2$ capture reactor 212.

$CO_2$ regeneration reactor 214 may use any means known in the art to heat the loaded $CO_2$ removal sorbent and desorb the gaseous $CO_2$. In an embodiment, a $CO_2$ flushing stream comprising some portion of the heated $CO_2$ stream is withdrawn from conduit 223 via conduit 225 and passed through heating unit 226 receiving heat from, for example, a steam flow through element 227. The $CO_2$ flushing stream issues from heating unit 226 and enters $CO_2$ regeneration reactor 214, providing the heat duty necessary to heat the loaded $CO_2$ removal sorbent to a temperature of greater than about 160° C. and generally about 200° C. Further, in an embodiment, heat transfer from the regenerated $CO_2$ removal sorbent transferring in conduit 224 to the loaded $CO_2$ removal sorbent transferring in conduit 220 through, for example, regenerative heat exchanger 233, further reduces the heat duty required by $CO_2$ regeneration reactor 214.

Second $H_2O$ regeneration reactor 215 establishes the heated $CO_2$ stream entering via conduit 223 and the partially regenerated $H_2O$ removal sorbent entering via conduit 222 at a fifth temperature of about 60° C. and a pressure less than about 1.5 atmospheres, and the heated $CO_2$ stream contacts the partially regenerated $H_2O$ removal sorbent, transferring a mass of $H_2O$ from the partially regenerated $H_2O$ removal sorbent to the heated $CO_2$ stream, generating a regenerated $H_2O$ removal sorbent, and producing a $CO_2$ exhaust stream at a temperature of about 60° C. The $CO_2$ exhaust stream is discharged from second $H_2O$ regeneration reactor 215 via exhaust 228, and regenerated $H_2O$ removal sorbent exits second $H_2O$ regeneration reactor 215 and enters $H_2O$ capture reactor 211 via conduit 229. The regenerated $H_2O$ removal sorbent is subsequently utilized as the $H_2O$ removal sorbent within $H_2O$ capture reactor 211.

In an embodiment, the regenerated $H_2O$ removal sorbent exiting second $H_2O$ regeneration reactor 215 via conduit 229 has a third moisture content, and the third moisture content is at least 30% of the first moisture content of the wet $H_2O$ removal sorbent entering first $H_2O$ regeneration reactor 213 via conduit 218. In another embodiment, the third moisture content is at least 50% of the second moisture content of the partially regenerated $H_2O$ removal sorbent entering second $H_2O$ regeneration reactor 215 via conduit 222.

In another embodiment, a third moisture content transfer rate is equal to a mass of the $H_2O$ sorbed on the regenerated $H_2O$ removal sorbent exiting second $H_2O$ regeneration reactor 215 via conduit 229 per unit time, and the third moisture content transfer rate is at least 30% of the first moisture content transfer rate of the sorbed $H_2O$ entering first $H_2O$ regeneration reactor 213 via conduit 218. In another embodiment, the third moisture content transfer rate is at least 50% of the second moisture content transfer rate of the sorbed $H_2O$ entering second $H_2O$ regeneration reactor 215 via conduit 222.

In an additional embodiment, the $CO_2$ exhaust stream discharging from second $H_2O$ regeneration reactor 215 via exhaust 228 exhibits a third mass flow rate of $H_2O$, and the third mass flow rate of $H_2O$ is less than about 60% of the first mass flow rate of $H_2O$ exhibited by the gaseous stream entering $H_2O$ capture reactor 211 at inlet 216. In a further embodiment, the third mass flow rate of $H_2O$ is greater than about 30% and less than about 60% of the first mass flow rate of $H_2O$. In another embodiment, the third mass flow rate of $H_2O$ is less than the second mass flow rate of $H_2O$ exhibited by the $H_2O$ exhaust stream discharging from first $H_2O$ regeneration reactor 213 via exhaust 221.

Within this disclosure, transport of removal sorbents via conduits 218, 220, 222, 224, and 229 may be accomplished in a variety of ways, including moving bed arrangements, fluidized transfer of pellets, and other means known to those skilled in the art. Similarly, the transport of various streams through conduits 216, 217, 219, 221, 223, 225, 227, 228, and 230 may be motivated in a variety of ways, including a pump, a pressure differential between the reactors, and other means known to those skilled in the art.

$H_2O$ capture reactor 211, $CO_2$ capture reactor 212, first $H_2O$ regeneration reactor 213, and second $H_2O$ regeneration reactor 215 may be any vessel known in the art and sufficient to accept a gaseous stream, accept the various removal sorbents described, initiate contact between the gaseous stream and the various removal sorbents described, and discharge a gaseous stream and a contacted removal sorbent subsequent to the contact, while maintaining specified pressure and temperature conditions during the contact. $CO_2$ regeneration reactor 214 may be any vessel known in the art and sufficient to accept the loaded $CO_2$ removal sorbent, heat the loaded $CO_2$ removal sorbent sufficiently to desorb gaseous $CO_2$, and discharge a heated $CO_2$ stream and a regenerated $CO_2$ removal sorbent subsequent to the contact, while maintaining specified pressure and temperature conditions during the heating. For example, $H_2O$ capture reactor 211, $CO_2$ capture reactor 212, first $H_2O$ regeneration reactor 213, $CO_2$ regeneration reactor 214, and second $H_2O$ regeneration reactor 215 may be a packed or fluidized bed reactor, or may incorporate moving beds for transport of the various removal sorbents into and out of the reactor.

Thus, provided here is a method for the removal of $H_2O$ and $CO_2$ from a gaseous stream comprising $H_2O$ and $CO_2$, such as a flue gas. The method utilizes first and second stage regenerations and relatively low temperature partial pressure changes to affect an overall regeneration sufficient for a cyclic operation incorporating $H_2O$ and $CO_2$ removal. The first and second regenerations generally provide retention of the initial monolayer of moisture on the various described removal sorbents, and typically only act to remove moisture layers bound to the initial monolayer, allowing the Gibbs free energy of mixing to largely compensate for the heats of reaction and largely avoiding the additional heats required for removal of the initial monolayer. Generally the applicable $H_2O$ sorption/desorption processes may be conducted at temperatures less than about 70° C. and pressures less than 1.5 atmospheres, with certain operations conducted at temperatures below 50° C.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of removing $CO_2$ and $H_2O$ from a gaseous stream comprising:

receiving the gaseous stream, where the gaseous stream comprises $CO_2$ and $H_2O$;

establishing the gaseous stream and an $H_2O$ removal sorbent at a first temperature and contacting the gaseous stream and the $H_2O$ removal sorbent at the first temperature, and transferring a portion of the $H_2O$ from the gaseous stream to the $H_2O$ removal sorbent, thereby generating a wet $H_2O$ removal sorbent and thereby generating a dry gaseous stream, where the wet $H_2O$ removal sorbent comprises the $H_2O$ removal sorbent and the portion of the $H_2O$ transferred and where the dry gaseous stream comprises the gaseous stream less the portion of the $H_2O$ transferred;

establishing the dry gaseous stream and a $CO_2$ removal sorbent at a second temperature and contacting the dry gaseous stream and the $CO_2$ removal sorbent at the second temperature, and transferring a portion of the $CO_2$ from the dry gaseous stream to the $CO_2$ removal sorbent, thereby generating a loaded $CO_2$ removal sorbent and thereby generating a dry $CO_2$ reduced stream, where the loaded $CO_2$ removal sorbent comprises the $CO_2$ removal sorbent and the portion of the $CO_2$ transferred and where the dry $CO_2$ reduced stream comprises the dry gaseous stream less the portion of the $CO_2$ transferred;

establishing the dry $CO_2$ reduced stream and the wet $H_2O$ removal sorbent at a third temperature and contacting the dry $CO_2$ reduced stream and the wet $H_2O$ removal sorbent at the third temperature, and transferring a first quantity of $H_2O$ from the wet $H_2O$ removal sorbent to the dry $CO_2$ reduced stream, where the first quantity of $H_2O$ is an amount of the portion of the $H_2O$ transferred from the gaseous stream to the $H_2O$ removal sorbent, thereby generating a partially regenerated $H_2O$ removal sorbent and thereby generating an $H_2O$ exhaust stream, where the partially regenerated $H_2O$ removal sorbent comprises the wet $H_2O$ removal sorbent less the first quantity of $H_2O$ transferred and where the $H_2O$ exhaust stream comprises the dry $CO_2$ reduced stream and the first quantity of $H_2O$ transferred;

heating the loaded $CO_2$ removal sorbent to a fourth temperature greater than the second temperature and desorbing a gaseous $CO_2$ from the loaded $CO_2$ removal sorbent, thereby generating a regenerated $CO_2$ removal sorbent and thereby generating a heated $CO_2$ stream, where the regenerated $CO_2$ removal sorbent comprises the loaded $CO_2$ removal sorbent less the gaseous $CO_2$ desorbed and where the heated $CO_2$ stream comprises the gaseous $CO_2$ desorbed;

establishing the heated $CO_2$ stream and the partially regenerated $H_2O$ removal sorbent at a fifth temperature greater than the third temperature and contacting the heated $CO_2$ stream and the partially regenerated $H_2O$ removal sorbent at the fifth temperature, and transferring a second quantity of $H_2O$ from the partially regenerated $H_2O$ removal sorbent to the heated $CO_2$ stream, where the second quantity of $H_2O$ is another amount of the portion of the $H_2O$ transferred from the gaseous stream to the $H_2O$ removal sorbent, thereby generating a regenerated $H_2O$ removal sorbent and thereby generating a $CO_2$ exhaust stream, where the regenerated $H_2O$ removal sorbent comprises the partially regenerated $H_2O$ removal sorbent less the second quantity of $H_2O$ and where the $CO_2$ exhaust stream comprises the heated $CO_2$ stream and the second quantity of $H_2O$; and repeating the receiving a gaseous stream step, the establishing the gaseous stream and the dry $H_2O$ removal sorbent at the first temperature step, the establishing the dry gaseous stream and the $CO_2$ removal sorbent at the second temperature step, the establishing the dry $CO_2$ reduced stream and the wet $H_2O$ removal sorbent at the third temperature step, the heating the loaded $CO_2$ removal sorbent to the fourth temperature step, and the establishing the heated $CO_2$ stream and the partially regenerated $H_2O$ removal sorbent at the fifth temperature step using the regenerated $H_2O$ removal sorbent as the $H_2O$ removal sorbent and using the regenerated $CO_2$ removal sorbent as the $CO_2$ removal sorbent.

2. The method of claim 1 where the wet $H_2O$ removal sorbent has a first moisture content and where the partially regenerated $H_2O$ removal sorbent has a second moisture content, and where the second moisture content is equal to at least 50% of the first moisture content.

3. The method of claim 2 where the regenerated $H_2O$ removal sorbent has a third moisture content, and where the third moisture content is equal to at least 30% of the first moisture content.

4. The method of claim 3 where the third moisture content is equal to at least 50% of the second moisture content.

5. The method of claim 4 where the $H_2O$ removal sorbent has an initial moisture content, and where the initial moisture content is equal to at least 30% of the first moisture content and equal to at least 50% of the second moisture content.

6. The method of claim 5 where the first temperature, the second temperature, the third temperature, and the fifth temperature are less than 70° C.

7. The method of claim 6 where the first temperature, the second temperature, and the third temperature are less than 50° C. and where the fifth temperature is greater than 50° C.

8. The method of claim 7 further comprising contacting the gaseous stream and the $H_2O$ removal sorbent at a first pressure, contacting the dry gaseous stream and the $CO_2$ removal sorbent at a second pressure, contacting the dry $CO_2$ reduced stream and the wet $H_2O$ removal sorbent at a third pressure, heating the loaded $CO_2$ loyal sorbent at a fourth pressure, and contacting the heated $CO_2$ stream and the partially regenerated $H_2O$ removal sorbent at a fifth pressure, where the first pressure, the second pressure, and the fifth pressure are less than 1.5 atmospheres.

9. The method of claim 8 where the $H_2O$ removal sorbent comprises a material having a specific surface area greater than 300 m2 per gram of the material and a pore greater than 0.40 ml per gram of the material.

10. The method of claim 9 where the material is an activated alumina, a 3A zeolite, a 4A zeolite, a silica gel, an absorbent clay, or mixtures thereof.

11. The method of claim 1 where the gaseous stream provides a first mass flow rate of $H_2O$ and where the $H_2O$ exhaust stream provides a second mass flow rate of $H_2O$, and where the second mass flow rate of $H_2O$ is less than 70% of the first mass flow rate of $H_2O$.

12. The method of claim 11 where the second mass flow rate of $H_2O$ is greater than about 40% of the first mass flow rate of $H_2O$.

13. The method of claim 12 where the $CO_2$ exhaust stream provides a third mass flow rate of $H_2O$, where the third mass flow rate of $H_2O$ is greater than or equal to 30% of the first mass flow rate of $H_2O$ and less than or equal to 60% of the first mass flow rate of $H_2O$.

14. The method of claim 13 where the first temperature, the second temperature, and the third temperature are less than 50° C., where the fourth temperature is greater than 160° C., and where the fifth temperature is greater than 50° C. and less than 70° C.

15. A method of removing $CO_2$ and $H_2O$ from a gaseous stream comprising:

contacting the gaseous stream and an $H_2O$ removal sorbent in a $H_2O$ capture reactor at a first temperature, where the gaseous stream comprises $CO_2$ and $H_2O$, and transferring a portion of the $H_2O$ from the gaseous stream to the $H_2O$ removal sorbent, thereby generating a wet $H_2O$ removal sorbent and thereby generating a dry gaseous stream, where the wet $H_2O$ removal sorbent comprises the $H_2O$ removal sorbent and the portion of the $H_2O$ transferred and where the dry gaseous stream comprises the gaseous stream less the portion of the $H_2O$ transferred;

discharging the dry gaseous stream from the $H_2O$ capture reactor to a $CO_2$ capture reactor;

transferring the wet $H_2O$ removal sorbent from the $H_2O$ capture reactor to a first $H_2O$ regeneration reactor;

contacting the dry gaseous stream and a $CO_2$ removal sorbent in the $CO_2$ capture reactor at a second temperature and transferring a portion of the $CO_2$ from the dry gaseous stream to the $CO_2$ removal sorbent, thereby generating a loaded $CO_2$ removal sorbent and thereby generating a dry $CO_2$ reduced stream, where the loaded $CO_2$ removal sorbent comprises the $CO_2$ removal sorbent and the portion of the $CO_2$ transferred and where the dry $CO_2$ reduced stream comprises the dry gaseous stream less the portion of the $CO_2$ transferred;

discharging the dry $CO_2$ reduced stream from the $CO_2$ capture reactor to the first $H_2O$ regeneration reactor;

transferring the loaded $CO_2$ removal sorbent from the $CO_2$ capture reactor to a $CO_2$ regeneration reactor;

contacting the dry $CO_2$ reduced stream and the wet $H_2O$ removal sorbent in the first $H_2O$ regeneration reactor at a third temperature and transferring a first quantity of $H_2O$ from the wet $H_2O$ removal sorbent to the dry $CO_2$ reduced stream, where the first quantity of $H_2O$ is an amount of the portion of the $H^2O$ transferred from the gaseous stream the $H_2O$ removal sorbent, thereby generating a partially regenerated $H_2O$ removal sorbent and thereby generating an $H_2O$ exhaust stream, where the partially regenerated $H_2O$ removal sorbent comprises the wet $H_2O$ removal sorbent less the first quantity of $H_2O$ transferred and where the $H_2O$ exhaust stream comprises the dry $CO_2$ reduced stream and the first quantity of $H_2O$ transferred;

exhausting the $H_2O$ exhaust stream from the first $H_2O$ regeneration reactor;

transferring the partially regenerated $H_2O$ removal sorbent from the first $H_2O$ regeneration reactor to a second $H_2O$ regeneration reactor;

heating the loaded $CO_2$ removal sorbent in the $CO_2$ regeneration reactor to a fourth temperature greater than the second temperature and desorbing a gaseous $CO_2$ from the loaded $CO_2$ removal sorbent, thereby generating a regenerated $CO_2$ removal sorbent and thereby generating a heated $CO_2$ stream, where the regenerated $CO_2$ removal sorbent comprises the loaded $CO_2$ removal sorbent less the gaseous $CO_2$ desorbed and where the heated $CO_2$ stream comprises the gaseous $CO_2$ desorbed;

discharging the heated $CO_2$ stream from the $CO_2$ regeneration reactor to the second $H_2O$ regeneration reactor;

contacting the heated $CO_2$ stream and the partially regenerated $H_2O$ removal sorbent in the second $H_2O$ regeneration reactor at a fifth temperature, where the fifth temperature is greater than the third temperature, and transferring a second quantity of $H_2O$ from the partially regenerated $H_2O$ removal sorbent to the heated $CO_2$ stream, where the second quantity of $H_2O$ is another amount of the portion of the $H_2O$ transferred from the gaseous stream to the $H_2O$ removal sorbent, thereby generating a regenerated $H_2O$ removal sorbent and thereby generating a $CO_2$ exhaust stream, where the regenerated $H_2O$ removal sorbent comprises the partially regenerated $H_2O$ removal sorbent less the second quantity of $H_2O$ and where the $CO_2$ exhaust stream comprises the heated $CO_2$ stream and the second quantity of $H_2O$;

exhausting the $CO_2$ exhaust stream from the second $H_2O$ regeneration reactor;

transferring the regenerated $H_2O$ removal sorbent from the second $H_2O$ regeneration reactor to the $H_2O$ capture reactor and transferring the regenerated $CO_2$ removal sorbent from the $CO_2$ regeneration reactor to the $CO_2$ capture reactor, and repeating the contacting the gaseous stream and the $H_2O$ removal sorbent step, the discharging the dry gaseous stream step, the transferring the wet $H_2O$ removal sorbent step, the contacting the dry gaseous stream and the $CO_2$ removal sorbent step, the discharging the dry $CO_2$ reduced stream step, the transferring the loaded $CO_2$ removal sorbent step, the contacting the dry $CO_2$ reduced stream and the wet $H_2O$ removal sorbent step, the exhausting the $H_2O$ exhaust stream step, the transferring the partially regenerated $H_2O$ removal sorbent step, the heating the loaded $CO_2$ removal sorbent step, the discharging the heated $CO_2$ stream step, the contacting the heated $CO_2$ stream and the partially regenerated $H_2O$ removal sorbent step, and the exhausting the $CO_2$ exhaust stream step, using the regenerated $H_2O$ removal sorbent as the $H_2O$ removal sorbent and using the regenerated $CO_2$ removal sorbent as the $CO_2$ removal sorbent.

16. The method of claim 15 where a first moisture content transfer rate is equal to a mass of $H_2O$ sorbed on the wet $H_2O$ removal sorbent and transferred to the first $H_2O$ regeneration reactor per unit time, and where a second moisture content transfer rate equal to a mass of $H_2O$ sorbed on the partially regenerated $H_2O$ removal sorbent and transferred from the first $H_2O$ regeneration reactor per unit time, and where the second moisture content transfer rate is equal to at least 50% of the first moisture content transfer rate.

17. The method of claim 16 where a third moisture content transfer rate is equal to a mass of $H_2O$ sorbed on the regenerated $H_2O$ removal sorbent and transferred from the second $H_2O$ regeneration reactor per unit time, and where the third moisture content transfer rate is at least 30% of the first moisture content transfer rate and at least 50% of the second moisture content transfer rate.

18. The method of claim 17 where the first temperature, the second temperature, and the third temperature are less than 50° C., and where the fifth temperature is greater than 50° C. and less than 70° C.

19. The method of claim 18 further comprising maintaining the $H_2O$ capture reactor at a first pressure, maintaining the $CO_2$ capture reactor at a second pressure, maintaining the first $H_2O$ regeneration reactor at a third pressure, maintaining the $CO_2$ regeneration reactor at a fourth pressure, and maintaining the second $H_2O$ regeneration reactor at a fifth pressure, where the first pressure, the second pressure, and the fifth pressure are less than 1.5 atmospheres.

20. The method of claim 19 where the $H_2O$ removal sorbent comprises a material having a specific surface area greater than 300 $m^2$ per gram of the material and a pore volume greater than 0.40 ml per gram of the material.

* * * * *